United States Patent Office 2,769,816
Patented Nov. 6, 1956

2,769,816

TRIFLUOROMETHYL DIPHENYLAMINE DYES

Nicholas J. Kartinos, Nazareth, and Albert C. Starke, Jr., Easton, Pa.

No Drawing. Application October 24, 1950, Serial No. 191,916

6 Claims. (Cl. 260—340.3)

This invention relates to new N-substituted nitroaminobenzotrifluorides and their application for the coloration of textile fibers of organic derivatives of cellulose, particularly cellulose esters and ethers, and of synthetic superpolyamides (or nylon) such as polyhexamethylene adipamide.

In U. S. P. 2,212,825, N-alkyl, aralkyl and aryl-substituted nitroamino-benzotrifluorides are broadly disclosed, and it is indicated that they can be used as dyestuffs for acetate silk. Many of these compounds have at best moderate affinity for acetate silk when applied in the form of an aqueous dispersion for dyeing such materials. While compounds which dye acetate silk in general also produce colorations on nylon, the colorations produced on these two kinds of fibers are generally not the same in strength, fastness or shade, and they are therefore not suitable for uniformly dyeing textiles containing a mixture of the two kinds of fiber.

It is an object of this invention to provide new N-substituted nitroamino-benzotrifluorides which possess outstanding affinity for textile fiber of an organic derivative of cellulose (especially cellulose esters such as cellulose acetate and ether such as ethyl cellulose), as well as for nylon fiber (especially polyhexamethylene adipamide), and to provide a process for coloring such fibers therewith.

Another object of the invention is to provide new compounds of the aforesaid class which, in addition to the aforesaid outstanding affinity for fibers of organic derivatives of cellulose and nylon, produce colorations of uniform fastness, shade and strength on both of the aforesaid types of fibers, whereby they are suitable for use on textiles containing a mixture of said fibers.

The new compounds of this invention have the general formula:

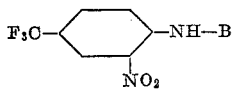

wherein B represents a benzene ring having at least one nuclear substituent chain of interconnected methylene groups and oxygen atoms, of the class consisting of hydroxy-mono- and -polyethenoxy groups, hydroxy-mono- and -polyethenoxy methyl groups, and a fused 1,3-dioxane ring. The polyethenoxy radicals occurring in said chains preferably contain two ethenoxy groups. The aforesaid chains preferably occupy positions meta or para to the —NH— group in the benzene ring included by B. The benzene ring included by B can be otherwise unsubstituted, or can contain non-solubilizing substituents such as alkyl (methyl or ethyl), halogen (chlorine or bromine), alkoxy (methoxy or ethoxy), or nitro groups.

We have found that the aforesaid compounds can be readily dispersed in aqueous coloring compositions containing dispersing or emulsifying agents, in the manner customarily employed for preparing aqueous dye baths and printing pastes for cellulose acetate fiber, and that they possess outstanding affinity for cellulose esters and ethers as well as for nylon. Moreover, we have found that certain of these compounds, particularly those in which B represents a hydroxyethoxyphenyl radical, yield colorations of uniform strength, shade and fastness properties on textile fibers of cellulose esters and ethers as well as nylon, and can therefore be used for coloring textiles containing both of these fibers in uniform shades.

The compounds of our invention can be readily prepared by reaction of 3-nitro-4-chlorobenzotrifluoride, in the presence of a hydrogen halide acceptor such as a weakly alkaline-reacting salt, with an amine of the formula B—NH₂, wherein B has the same significance as in the general formula defined above.

Preparation of the compounds of this invention and their application for coloration of textile fibers of organic derivatives of cellulose and of nylon are illustrated in the following examples, wherein parts and percentages are by weight unless otherwise specified.

Example 1

11.3 parts (0.05 mol) of 3-nitro-4-chlorobenzotrifluoride were mixed, in the presence of a solution of 4.2 parts of sodium bicarbonate in 25 parts of water with 7.6 parts (0.05 mol) of p-(2′-hydroxyethoxy)-aniline. The mixture was agitated and heated to boiling under reflux for 24 hours. On cooling, a precipitate was formed, which was separated by filtration, and recrystallized from isopropyl alcohol. The product thus obtained was in the form of red-orange needles having a melting point of 68 to 70° C., the yield being 16.95 parts or 99% of theory.

The same product was obtained in similarly high yield by heating the reagents specified above in the absence of water at 100 to 150° C. for 5 to 30 minutes, washing the reaction mixture with water and recrystallizing from isopropyl alcohol. The product of this example has the formula:

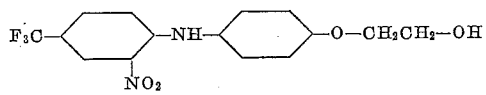

For dyeing cellulose acetate fiber, 1 to 3 parts of the aforesaid compound were dissolved in a small amount of a solvent composition of equal parts of alcohol and acetone, and 40 parts of a 5% aqueous solution of N,N-oleyl methyl taurine sodium salt were added thereto. The resulting concentrated dispersion was diluted with water at 45 to 55° C. to a total of 5000 parts. 100 parts of cellulose acetate silk were worked in the resulting aqueous dispersion of the color compound, and the temperature raised to 70 to 90° C. When dyeing was complete, the cellulose acetate was removed from the bath, washed with dilute aqueous soap solution, rinsed and dried. Nylon (polyhexamethylene adipamide) can be dyed in a similar manner. Both fibers are dyed uniformly in the same brilliant reddish-yellow shade under similar conditions, the coloration having the same strength and fastness properties. The dyestuff shows excellent tinctorial strength, and the affinity of the dyestuff for both fibers was excellent as indicated by the rapid exhaust of the dye bath. The coloration was further characterized by excellent fastness to light.

Example 2

Substitution of a similar quantity of m-(2-hydroxyethoxy) aniline for the corresponding p-isomer in the procedure of the foregoing example yielded a condensation product having a melting point of 93 to 95° C. in high yields. This product has the following formula:

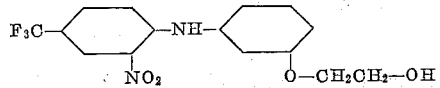

When applied in the same manner as in Example 1 for dyeing cellulose acetate fiber and nylon, golden yellow shades were produced of the same color, strength, and fastness properties on both fibers when applied under similar conditions. The dye-stuff likewise exhibits excellent affinity for both fibers, high tinctorial strength, and the colorations exhibit excellent light fastness.

The dyestuff of Examples 1 and 2 are unusually superior to the corresponding dyestuff obtained by similar condensation of 3-nitro-4-chlorobenzotrifluoride with p-phenetole in affinity for the fiber and tinctorial strength.

*Example 3*

Substitution of an equivalent amount (in mols) of an amine having the following formula:

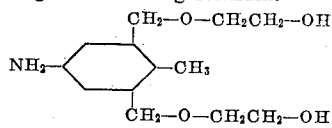

for the hydroxyethoxy anilines of Examples 1 and 2 yields, on treatment in accordance with the foregoing examples, a yellow crystalline product having a melting point of 105 to 110° C. The formula of this compound is as follows:

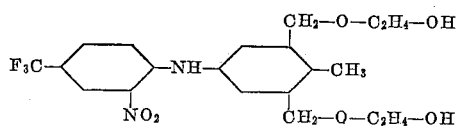

When applied for dyeing cellulose acetate fiber, as described in Example 1, it exhibits excellent affinity for the fiber and yields brilliant green-yellow shades of excellent fastness to light. Valuable greenish-yellow shades are also produced on nylon fiber.

*Example 4*

Upon substituting, in the process of Examples 1 and 2, an equivalent amount (in mols) of an amine having the following formula:

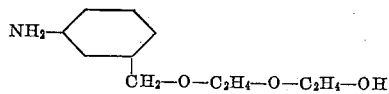

for the hydroxyethoxy anilines of the first two examples, an oily product is obtained having a formula as follows:

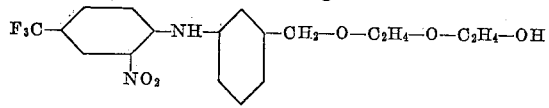

This product, when dispersed in the same manner as in the foregoing examples, yields a dispersion which produces similar yellow shades of excellent fastness to light on cellulose acetate and nylon, the dyestuff also showing excellent affinity for the fiber and outstanding tinctorial strength.

*Example 5*

An equivalent amount (in mols) of 6-amino-1,3-benzodioxane having the formula:

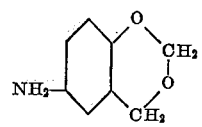

was substituted for the hydroxyethoxy anilines in the procedure of Examples 1 and 2. The product obtained from the resulting reaction had a melting point of 127 to 129° C., and corresponded to the following formula:

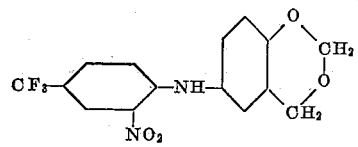

This compound, when applied as described in Examples 1 and 2 for dyeing cellulose acetate, produces red-yellow shades and exhibits excellent affinity and tinctorial strength. Similarly desirable shades are also produced on nylon.

Instead of the amines disclosed in the examples, other primary aminobenzenes can be used which contain as substituents in the nucleus at least one hydroxy-mono- or -polyethenoxy group, at least one hydroxy-mono- or -polyethenoxy methyl group, or a fused 1,3-dioxane ring. Moreover, instead of the amines of the examples, nuclearly substituted derivatives thereof can be employed containing, for example, chlorine, a nitro group, an alkyl or an alkoxy group, providing they do not contain salt-forming water-solubilizing substituents such as a sulfo or carboxyl group. Such primary aminobenzenes readily react with 3-nitro-4-halobenzotrifluorides on heating in the presence of a hydrogen halide acceptor to form the compounds of the invention.

Variations and modifications which will be obvious to those skilled in the art can be made in the procedures described herein without departing from the scope or spirit of the invention.

We claim:

1. A compound having the formula:

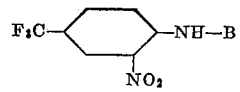

wherein B represents a benzene ring containing 1–2 nuclear substituent chains of interconnected methylene groups and oxygen atoms containing up to five carbon atoms and not more than one hydroxyl group, of the class consisting of hydroxy-mono- and -polyethenoxy groups, hydroxy-mono- and -polyethenoxy methyl groups, and a fused, otherwise unsubstituted 1,3-dioxane ring.

2. A compound having the following formula:

3. A compound having the following formula:

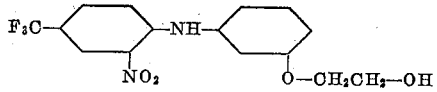

4. A compound having the following formula:

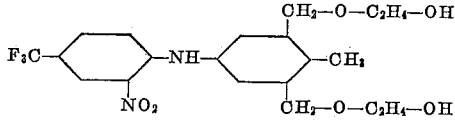

5. A compound having the following formula:

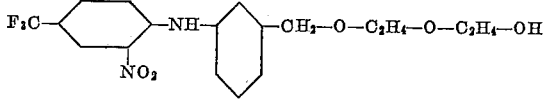

6. A compound having the following formula:

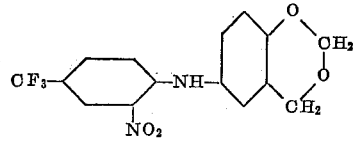

References Cited in the file of this patent

UNITED STATES PATENTS

| | | |
|---|---|---|
| 2,212,825 | Daudt | Aug. 27, 1940 |
| 2,409,134 | Lecher et al. | Oct. 8, 1946 |
| 2,426,576 | Goulding | Aug. 26, 1947 |
| 2,464,885 | Olpin | Mar. 22, 1949 |
| 2,470,095 | Dickey | May 17, 1949 |
| 2,546,121 | Buc | Mar. 20, 1951 |